Figure 1:
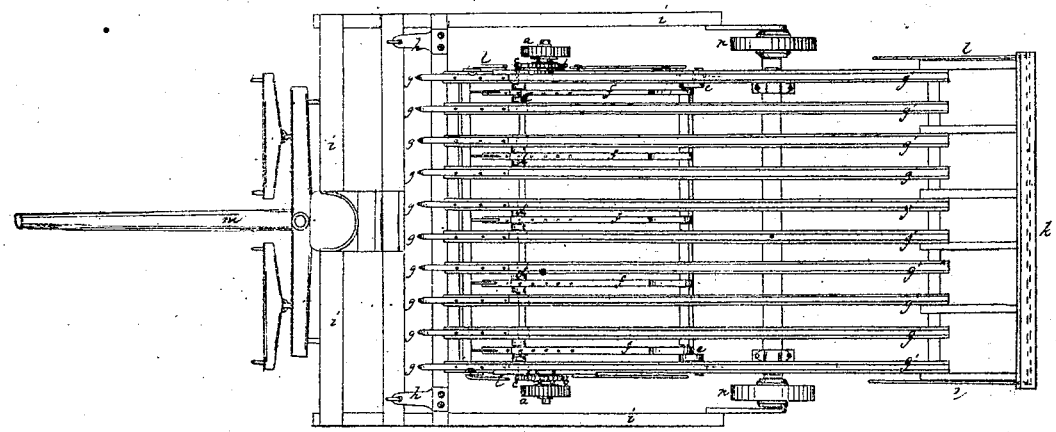
Figure 1:
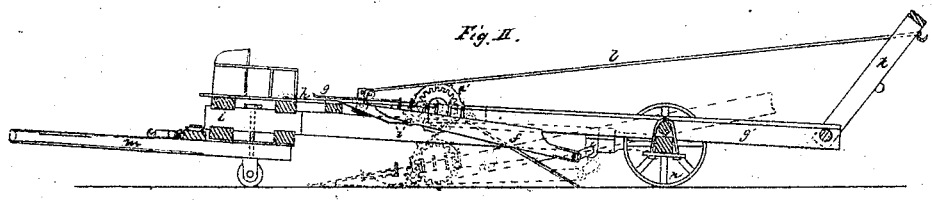
Figure 1:
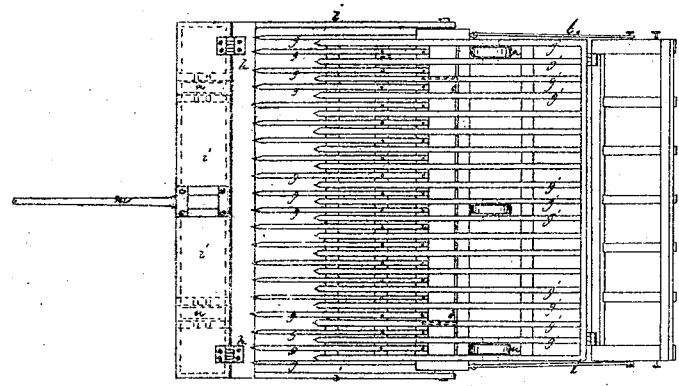
Figure 1:
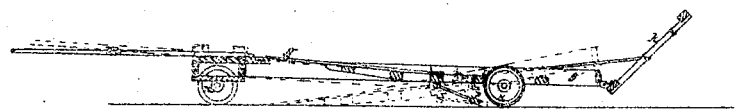

W. T. Nichols.
Hay-Raker & Loader
No. 75450. Patented Mar. 10, 1868

Fig. II.

Fig. III.

Fig. IV.

Witnesses:

Inventor
W. T. Nichols

United States Patent Office.

W. T. NICHOLS, OF RUTLAND, VERMONT.

Letters Patent No. 75,450, dated March 10, 1868.

IMPROVEMENT IN HAY-RAKERS AND LOADERS.

*The Schedule referred to in these Letters Patent and making part of the same.*

Be it known that I, W. T. Nichols, of Rutland, in the county of Rutland, and State of Vermont, have invented a new and useful Improvement in "Hay-Rake Wagons;" and I do hereby declare that the following is a full, clear, and exact description of the construction and operation of the same, reference being had to the annexed drawings, making a part of this specification, in which—

Figure I is a top view with the crank loading-frame.
Figure II is a side view with the crank loading-frame.
Figure III is a top view without the crank loading-frame.
Figure IV is a side view without the crank loading-frame.

$a$ is the land driving-wheel of the loading-frame; $b$ is the driving-pinion or gear attached to the land driving-wheel of the crank loading-frame; $c$ is the pinion or gear attached to the crank-journal of the crank loading-frame; $d$ is the crank of the loading-frame; $e$ is the rock-shaft of the loading-frame; $fffff$ are the bars of the crank loading-frame; $o\ o\ o\ o\ o\ o$ are upright teeth in the bars of the loading-frame; $i$ is the connecting-frame, carrying the fore wheels and clapper $h$, and connecting with the rear part of the rake-wagon; $q\ q$ are the elastic supplementary teeth, made of steel, as shown in Figs. I and II, and of wood, as shown in Figs. III and IV; $q'\ q'$ are the main teeth of the rake, forming, with the supplementary ones, $q\ q$, the bottom of the rake, when used as a rake, and also the bottom of the wagon when used as a wagon; $h$ is the clapper to support the bottom $q'\ q'$ and $q\ q$ above the ground when used as a wagon; $k$ is the rear frame to keep the hay from sliding off the rear end; $l$ is the brace-rod to hold the frame $k$ in position; $m$ is the tongue to which the draught is applied; $n\ n$ are wheels set upon an axle, as shown in Figs. I and II, or between the teeth $q'\ q'$, as shown in Figs. III and IV; $p$ is the lifting-lever under the bottom of the rake.

The drawings will show the method of construction better than words of description; but in general terms the rake is composed of teeth $q'\ q'$, about seventeen feet long, five inches wide, by one inch thick, set upon their edges, and held together by a sufficient number of stays, either by rods passing through them, and blocks of wood between each tooth, as shown in Fig. I, or by flat pieces bolted upon the bottom edges, as shown in Fig. III. At the front end of these teeth $q'\ q'$ are the elastic or supplementary teeth, $q\ q$, properly fastened, as shown in the drawings, and when made of steel should be applied or attached upon the ends of the teeth, $q'\ q'$, as shown in Fig. I, and when made of wood, should be fastened between the teeth $q'\ q'$, as shown in Fig. III.

When a wide rake is desired, say twenty feet in width, and for use upon level surfaces, the rake may be constructed as shown in Fig. III, with wooden supplementary elastic teeth placed between the main teeth, and with two wheels, say ten to fifteen inches in diameter, placed between the main teeth with short axles, as shown, the method allowing the use of several wheels, with no large or heavy axle to sustain them.

Upon rough or hilly surfaces, a rake of the width above mentioned will be found to be impracticable, and hence a rake, say ten feet wide by twenty feet long, would be more desirable; and for the purpose of getting more hay upon it than would naturally slide upon it with larger wheels, the crank loading-frame may be attached. The land driving-wheel of said frame carries with it the pinion attached to it, which gears into the pinion upon the end of the crank-shaft, and hence gives the cranks a rotary motion in the opposite direction to the movement of the rake. These cranks carry one end of the loading-frame bars, while the other ends of said bars are carried by the rock-shaft $e$; hence as the cranks revolve these bars are brought above the upper edges of the teeth, upon which the hay rests, the upright teeth $o\ o\ o\ o$ stick into the hay, and by the further revolution of the cranks, the hay is carried backward upon the teeth, while the next revolution repeats the same operation.

The elastic supplementary teeth are used so that as the load accumulates upon them, they will come flat upon the ground, and leave the stubble sticking up between them, and the friction of the hay against the stubble will cause it to slide backwards upon the rake.

When the rake is sufficiently loaded, the driver backs up his team, and the lever $p$ sticks into the ground and raises the forward end of the rake above the clapper $h$, when the clapper falls, and the forward end of the rake rests upon it, which loads the hay and converts the rake into a wagon, and the forward motion of the team relieves the lever $p$ from the ground, and the load is ready to be drawn to its place of destination.

This improvement is in addition to and is designed to be used in connection with a hay-rake wagon, of which Letters Patent were granted to me, this 28th day of January, 1868—No. 73,747.

What I claim, and desire to secure by Letters Patent, is—

1. The combination of the gathering and loading-rake $q'$ $q'$, &c., and the supplementary elastic teeth $q$ $q$, substantially as and for the purposes set forth and described.

2. The combination of the vibrating gathering-rake, and the auxiliary loading-frame $ff$, substantially as set forth and described.

3. Driving the auxiliary loading-frame $f$ by the carrying-wheels $a$, or their equivalent, said wheels being attached to and vibrating with the gathering-frame $q'$ $q'$, substantially as set forth.

4. The combination of the land-wheel $a$, pinions $b$ and $c$, cranks $d$, and rock-shaft $e$, substantially as and for the purpose set forth.

5. The small wheels $n$ $n$, located between the teeth $q'$ $q'$, and having their bearing attached to said teeth, substantially as set forth.

6. The connecting-frame $i$ $i$ $i$, attached to rake-frame, as and for the purposes set forth and described.

W. T. NICHOLS.

Witnesses:
    R. W. FENWICK,
    W. READ.